United States Patent
Kim et al.

(10) Patent No.: US 9,356,475 B2
(45) Date of Patent: May 31, 2016

(54) WIRELESS POWER RECEIVER AND CONTROL METHOD OF SAME

(71) Applicant: Samsung Electronics Co., Ltd., Gyeonggi-do (KR)

(72) Inventors: Joon-Il Kim, Seoul (KR); Se-Ho Park, Gyeonggi-do (KR); Sung-Bum Park, Gyeonggi-do (KR); Young-Min Lee, Gyeonggi-do (KR); Woo-Ram Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 772 days.

(21) Appl. No.: 13/676,722

(22) Filed: Nov. 14, 2012

(65) Prior Publication Data

US 2013/0119780 A1  May 16, 2013

(30) Foreign Application Priority Data

Nov. 16, 2011   (KR) ........................ 10-2011-0119544

(51) Int. Cl.
*H02J 5/00*   (2006.01)
*H02J 17/00*  (2006.01)
*H04B 5/00*   (2006.01)
*H02J 7/02*   (2016.01)

(52) U.S. Cl.
CPC ................. *H02J 17/00* (2013.01); *H02J 5/005* (2013.01); *H02J 7/025* (2013.01); *H04B 5/005* (2013.01)

(58) Field of Classification Search
CPC ........... H02J 17/00; H02J 5/005; H02J 7/025; H04B 5/005
See application file for complete search history.

(56) References Cited

U.S. PATENT DOCUMENTS

| | | | |
|---|---|---|---|
| 7,522,878 B2* | 4/2009 | Baarman | 455/41.1 |
| 8,339,096 B2* | 12/2012 | Osada | 320/108 |
| 2005/0134213 A1* | 6/2005 | Takagi et al. | 320/108 |
| 2009/0212736 A1* | 8/2009 | Baarman et al. | 320/106 |
| 2010/0036773 A1* | 2/2010 | Bennett | 705/67 |
| 2011/0115303 A1* | 5/2011 | Baarman et al. | 307/104 |
| 2012/0050015 A1* | 3/2012 | Low et al. | 340/10.1 |

* cited by examiner

*Primary Examiner* — Zeev V Kitov
(74) *Attorney, Agent, or Firm* — The Farrell Law Firm, P.C.

(57) ABSTRACT

A wireless power receiver is provided that includes a communication unit for receiving wireless power and a communication signal from a wireless power supplier; a controller for determining whether the wireless power is received from the wireless power supplier; a loader for storing the wireless power; and a switching unit for, when the wireless power is received, dividing the wireless power and the communication signal by a predetermined ratio and transferring the divided power to the controller and the loader based on the predetermined ratio.

16 Claims, 8 Drawing Sheets

WIRELESS POWER RECEIVER AND CONTROL METHOD OF SAME

PRIORITY

This application claims priority under 35 U.S.C. §119(a) to Korean Application Serial No. 10-2011-0119544, filed in the Korean Intellectual Property Office on Nov. 16, 2011, the entire content of which is incorporated herein by reference.

BACKGROUND OF THE INVENTION

1. Field of the Invention

The present invention relates generally to a wireless power receiver and a control method for the same and, more particularly, to a wireless power receiver for wirelessly receiving power based on an electromagnetic resonant technique and a control method of the same.

2. Description of the Related Art

Mobile terminals such as a mobile phone, a PDA (Personal Digital Assistant) and the like are powered by rechargeable batteries, and the battery of the mobile terminal is charged using a separate charging apparatus. In general, a separate contact terminal is arranged external to the charging apparatus and the battery, and the charging apparatus and the battery are electrically connected to each other through contact between the respective external terminals.

However, since the contact terminal outwardly protrudes in this contact type charging scheme, the contact terminal is easily contaminated by foreign substances and thus the battery charging is often not correctly performed. Further, the battery charging may also not be correctly performed when the contact terminal is exposed to moisture.

Recently, a wireless charging or a non-contact charging technology is developed and used for electronic devices to solve the above-mentioned problem.

This wireless charging technology employs wireless power transmission/reception, and corresponds to, for example, a system in which a battery can be automatically charged if the battery is laid on a charging pad without any physical connection of the mobile phone to a separate charging connector. The wireless charging technology is generally used to charge a wireless electric toothbrush or a wireless electric shaver. Accordingly, a waterproof function can be improved since electronic products are wirelessly charged through the wireless charging technology, and the portability of electronic devices can be increased since there is no need to provide a wired charging apparatus. Therefore, developments of technologies related to the wireless charging technology are expected to significantly increase, particularly with development of electric cars.

The wireless charging technology largely includes an electromagnetic induction scheme using a coil, a resonance scheme using a resonance, and an RF/microwave radiation scheme converting electrical energy to microwave energy and then transmitting the microwave energy.

The electromagnetic induction scheme is considered to be mainstream, and is expected that all electronic products will in the future be charged, anytime and anywhere, without any hard wire connection, particularly in view of the strength of recent successful experiments for wirelessly transmitting microwave power to a destination located dozens of meters away.

A power transmission method through the electromagnetic induction corresponds to a scheme of transmitting power between a first coil and a second coil. When a magnet approaches the coil, an induced current is generated. A transmission side generates a magnetic field using the induced current and a reception side generates energy through an induced current according to changes in the magnetic field. The phenomenon is referred to as magnetic induction, and the power transmission method using magnetic induction has a high energy transmission efficiency.

With respect to the resonance scheme, Prof. Soljacic of MIT announced a system in which electricity is wirelessly transferred using a power transmission principle of the resonance scheme based on a coupled mode theory, even if a device to be charged is separated from a charging device by several meters. The wireless charging system employs a physical concept based on a resonated electromagnetic waves containing electrical energy instead of resonating sound energy. The resonated electrical energy directly transfers only when there is a device having a resonance frequency and any portion of unused electrical energy is reabsorbed into an electromagnetic field instead of being spread in the air, with the electrical energy not otherwise affecting surrounding machines or people.

Meanwhile, a wireless power receiver according to the conventional resonance scheme performs a communication function with a wireless power supplier based on a predetermined mode, and transmits a charging state of the wireless power receiver, a control signal for controlling the wireless power supplier, and the like. However, the conventional wireless power receiver should have a separate communication module for communication, other than a power reception means for wirelessly receiving power from the wireless power supplier, for example, a coil. Complications arise because the wireless power receiver cannot distinguish a signal for power supply and a signal for communication, thereby requiring an additional communication module.

Accordingly, problems occur since conventional wireless power receiver have an increased total volume due to the additional communication module, and have an increased power consumption to drive the communication module.

SUMMARY OF THE INVENTION

The present invention has been made to solve the above mentioned problems and provides a wireless power receiver which does not require an additional communication module to perform a communication function through a wireless power reception means, and a control method of the same.

In accordance with an aspect of the present invention, a wireless power receiver is provided, that includes a communication unit for receiving wireless power and a communication signal from a wireless power supplier; a controller for determining whether the wireless power is received from the wireless power supplier; a loader for storing the wireless power; and a switching unit for, when the wireless power determined to have been received dividing a total input power by a predetermined ratio and transferring the divided power to the controller and the loader, based on the predetermined ratio.

In accordance with another aspect of the present invention, a method of controlling a wireless power receiver is provided, that includes receiving wireless power and a communication signal from a wireless power supplier; determining whether the wireless power is received from the wireless power supplier; when the wireless power is determined to have been received, dividing the wireless power and the communication signal by a predetermined ratio; and transferring the divided total power through different paths to store the wireless power and to process the communication signal.

In accordance with another aspect of the present invention, a wireless power receiver is provided that includes a communication unit for receiving wireless power and a communication signal having different frequencies from a wireless power supplier; a controller for generating a signal corresponding to the received communication signal; a loader for storing the wireless power; and a frequency selector for distinguishing the frequencies of the wireless power and the communication signal, and for outputting the wireless power and the communication signal to the loader and the controller, respectively.

In accordance with another aspect of the present invention, a method of controlling a wireless power receiver is provided that includes receiving at least one of wireless power and a communication signal having different frequencies from a wireless power supplier; distinguishing the frequencies of the wireless power and the communication signal and independently outputting the wireless power and the communication signal; storing the wireless power; and generating a corresponding communication signal corresponding to the communication signal.

In accordance with another aspect of the present invention, a method of controlling a wireless power receiver is provided that includes receiving wireless power and a communication signal from a wireless power supplier; determining whether frequencies of the wireless power and the communication signal are equal; when the frequencies of the wireless power and the communication signal are equal, dividing a total input power including the wireless power and the communication signal by a predetermined ratio and independently processing the wireless power and the communication signal based on the predetermined ratio; and when the frequencies of the wireless power and the communication signal are different, distinguishing the frequencies of the wireless power and the communication signal and independently processing the wireless power and the communication signal.

According to various embodiments of the present invention, a wireless power receiver including a single communication means for simultaneously performing wireless power reception and communication may be provided. Accordingly, it is possible to independently control wireless power and a communication signal without a demand for an additional communication means, thereby making the entire wireless power receiver thinner and lighter.

BRIEF DESCRIPTION OF THE DRAWINGS

The above and other features, aspects, and advantages of the present invention will be more apparent from the following detailed description taken in conjunction with the accompanying drawings, in which.

DETAILED DESCRIPTION OF EMBODIMENTS OF THE INVENTION

Figure 1A:
FIG. 1A illustrates transmission/reception of wireless power and a communication signal by a wireless power receiver and a wireless power supplier according to the present invention.

Hereinafter, embodiments of the invention will be described in detail with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

FIG. 1A illustrates transmission/reception of wireless power and a communication signal by a wireless power receiver and a wireless power supplier according to the present invention.

As illustrated in FIG. 1A, a wireless power receiver 120 according to the present invention can receive wireless power and/or a communication signal from a wireless power supplier 110.

The wireless power supplier 110 can, for example, supply wireless power to the wireless power receiver 120 authenticated by performing a predetermined authentication process. The wireless power supplier 110 can supply power wireless power based on a resonant technique, and accordingly transmit an electromagnetic wave for resonance having a predetermined frequency.

The wireless power receiver 120 can receive wireless power from the wireless power supplier 110 to charge a battery arranged in the wireless power receiver 120. Here, the wireless power receiver 120 may be an apparatus capable of processing or transmitting/receiving a predetermined communication packet and may be implemented by, for example, a mobile phone, a PDA, a smart phone and the like.

The wireless power supplier 110 also can perform a communication function with the wireless power receiver 120 in a predetermined mode. For the wireless power receiver 120, the wireless power supplier 110 can transmit an inquiry signal for a wireless power reception state, a control signal for a reception condition of the wireless power receiver 120 and the like based on a predetermined communication mode. Further, for the wireless power supplier 110, the wireless power receiver 120 can transmit a wireless power reception state signal corresponding to the inquiry signal, a charging state signal, identifier (ID) information of the wireless power receiver, power reception related information, position information, environment setting information, safety related information, wireless power supplier control information and the like to the wireless power supplier 110 based on a predetermined communication mode.

Here, a frequency of the wireless power and a frequency of the communication signal may be equal or different. In the detailed description that is provided below, even when the frequency of the wireless power and the frequency of the communication signal are equal or different, the wireless power receiver 120 can independently process the wireless power and the communication signal using a single communication module.

Figure 1B:
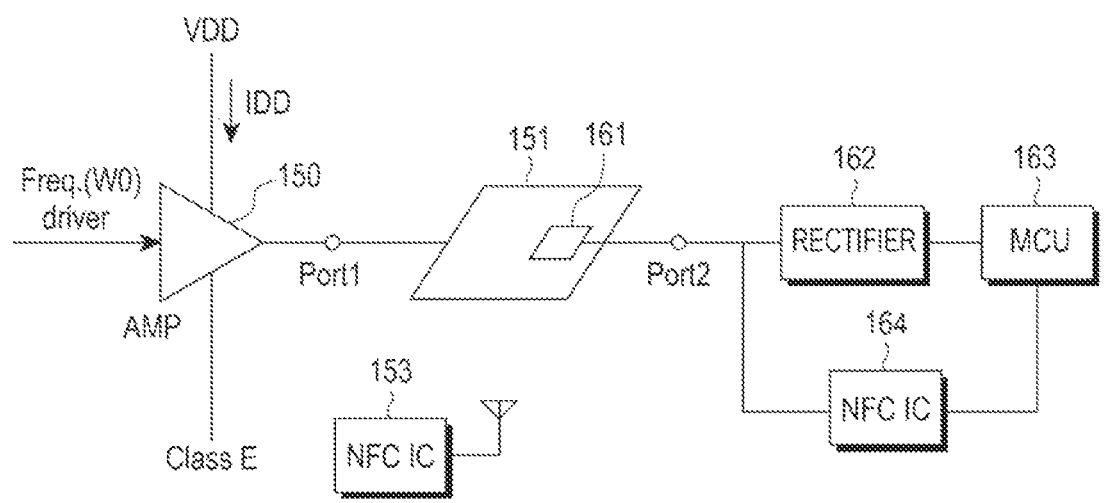
FIG. 1B illustrates a wireless power receiver and a wireless power supplier according to the present invention.

FIG. 1B illustrates the wireless power receiver and the wireless power supplier according to the present invention. As illustrated in FIG. 1B, the wireless power supplier includes an amplifier 150, a loop coil 151, and a Near Field Communication (NFC) integrated circuit 153. The amplifier 150 can receive an electromagnetic wave having a frequency induced from a frequency driver. Further, the amplifier 150 can receive a driving current (IDD) from a driving voltage (VDD), and may be implemented by a Class E amplifier. The loop coil 151 can emit a predetermined electromagnetic wave based on a signal received from the amplifier 150. The NFC integrated circuit 153 can transmit/receive the communication signal based on a predetermined mode. Here, the frequency of the wireless power and the frequency of the communication signal may be equal or different.

The wireless power receiver includes a loop coil 161, a rectifier 162, a control unit 163, and a NFC integrated circuit 164. The loop coil 161 can receive the wireless power from the loop coil 151, and receives the communication signal from the NFC integrated circuit 153. The wireless power receiver outputs the wireless power to the rectifier 162 via port 2, and outputs the communication signal to the NFC integrated circuit 164. The control unit 163 controls a general operation of the wireless power receiver, and generates a corresponding communication signal based on the communication signal from the NFC integrated circuit 164.

Figure 2A:
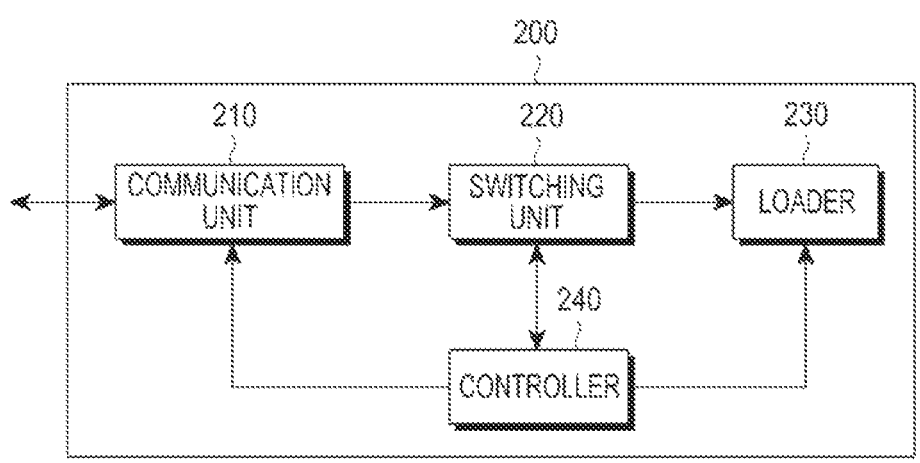
FIG. 2A is a block diagram of the wireless power receiver according to the present invention.

FIG. 2A is a block diagram of the wireless power receiver 200. As illustrated in FIG. 2A, the wireless power receiver 200 includes a communication unit 210, a switching unit 220, a loader 230, and a controller 240.

The communication unit 210 can receive wireless power provided from the wireless power supplier. The wireless power receiver 200 can receive wireless power from the wireless power supplier based on a resonant technique, and accordingly may be implemented by a loop coil having a predetermined inductance.

The communication unit 210 can receive the wireless power by resonant coupling via an electromagnetic field output from the wireless power supplier. When the communication unit 210 is implemented by the loop coil, an inductance (L) of the loop coil can be changed, and accordingly a configuration of receiving electromagnetic waves of various frequencies, that is, wireless power, is possible.

Meanwhile, the communication unit 210 also can receive a communication signal transmitted from the wireless power supplier.

The communication unit 210 performs communication with the wireless power supplier using NFC, Zigbee™ communication, infrared communication, visible ray communication and the like. The communication unit 210 performs communication with the wireless power supplier based on at least one modulation/demodulation mode of an Amplitude Shift Keying (ASK) mode, a Phase Shift Keying (PSK) mode, and a Frequency Shift Keying (FSK) mode.

The controller 240 controls a general operation of the wireless power receiver 200. The controller 240 determines whether both the wireless power and the communication are all received from the wireless power supplier or only the communication signal is received from the wireless power supplier. The controller 240 may be implemented in a form of a microprocessor, an Integrated Circuit (IC) capable of performing an operation, a mini computer or the like.

The loader 230 stores the received wireless power in the wireless power receiver or externally outputs the wireless power. The loader 230 may be implemented in a battery type for storing the wireless power or in a type such as a power output means, for example, a power interface.

The switching unit 220 electrically connects the communication unit 210 and the loader 230. As a result of the determination of the controller 240, when the communication unit 210 simultaneously receives the wireless power and the communication signal, the switching unit 220 divides total power including the wireless power and the communication signal by a predetermined ratio and performs switching to transfer the divided power to the loader 230 and controller 240. Here, when the predetermined ratio is 1:N, with N being a natural number larger than 1, the switching unit 220 can transfer a divided portion of the total power corresponding to N to the loader 230 and transfer a divided portion of the total power corresponding to 1 to the controller 240. Since the wireless power is larger in comparison with communication signal power, the switching unit 220 transfers power having a large ratio among the total power, that is, the divided portion corresponding to N to the loader 230, and transfers a lesser amount of power than the total power, that is, the divided portion corresponding to 1, to the controller 240 for processing the communication signal. When the wireless power and the communication signal use the same frequency, both the wireless power and the communication signal can be all processed using one communication unit 210 without an addition of a communication module.

Figure 2B:
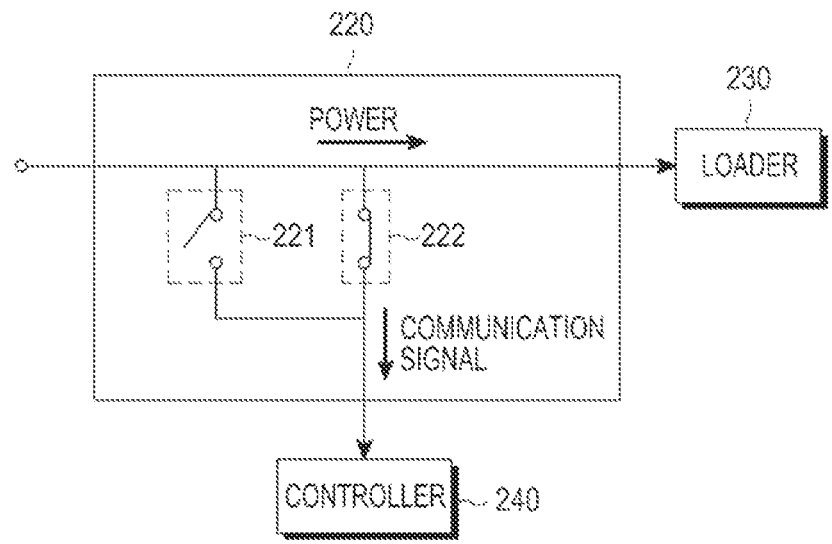
FIG. 2B is a block diagram showing operation of a switching unit when wireless power and a communication signal are received together from a wireless power supplier, according to the present invention.

FIG. 2B is a block diagram showing operation of the switching unit 220 when the wireless power and the communication signal are received together from the wireless power supplier.

As illustrated in FIG. 2B, the switching unit 220 includes a first switch 221 and a second switch 222. One end of the first switch 221 and one end of the second switch 222 are connected to both the communication unit 210 and the loader 230. The other end of the first switch 221 and the other end of the second switch 222 are connected to the controller 240. As shown in FIG. 2B, the first switch 221 is open and the second switch 222 is closed. When the second switch 222 is closed, the divided portion of the total power corresponding to N is output to the loader 230, and the divided portion of the total power is output to the controller 240. The second switch 222 divides the total power by the predetermined ratio of 1:N, according to the predetermined ratio. The total power may be divided by resistance values of the first switch 221 and the second switch 222, with other configurations for dividing the total power by an additional resistance instead of the resistance value of the second switch 222 also being possible.

The first and second switches open and close according to a control of the controller 240. The first and second switches may be, for example, an N or P type MOSFET device. When the first and second switches are the N type MOSFET device, a bootstrapping circuit may be further included.

The controller 240 determines whether the communication signal is included in total input power, and when it is determined that the communication signal is included in the total input power, the controller 240 opens the first switch 221 and closes the second switch 222. When the first switch 221 and the second switch 222 are, for example, N type MOSFET devices, the controller 240 generates gate control signals for the first switch 221 and the second switch 222 and outputs the generated gate control signals to the first switch 221 and the second switch 222, respectively.

Meanwhile, the controller 240 generates a corresponding communication signal based on the input communication signal and outputs the corresponding communication signal to the communication unit 210 (FIG. 2A).

According to the above described configuration, when the wireless power and the communication signal are simultaneously input, the wireless power and the communication signal are individually processed using a single communication unit.

Figure 2C:
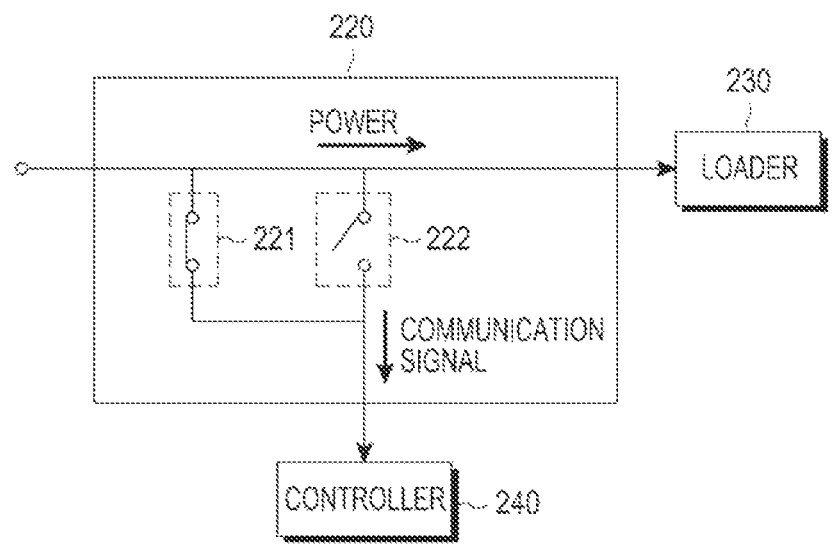
FIG. 2C is a block diagram showing operation of a switching unit when only a communication signal is received from a wireless power supplier, according to the present invention.

FIG. 2C is a block diagram showing operation of the switching unit when only the communication signal is received from the wireless power supplier.

As illustrated in FIG. 2C, the switching unit 220 includes the first switch 221 and the second switch 222, as described above in regards to FIG. 2B.

When the controller 240 determines that the communication unit receives only the communication signal, the controller 240 closes the first switch 221 and opens the second switch 222, thereby transferring only the communication signal to the controller 240. The controller 240 generates a corresponding communication signal based on the input communication signal and outputs the corresponding communication signal to the communication unit 210 (FIG. 2A).

Figure 3:
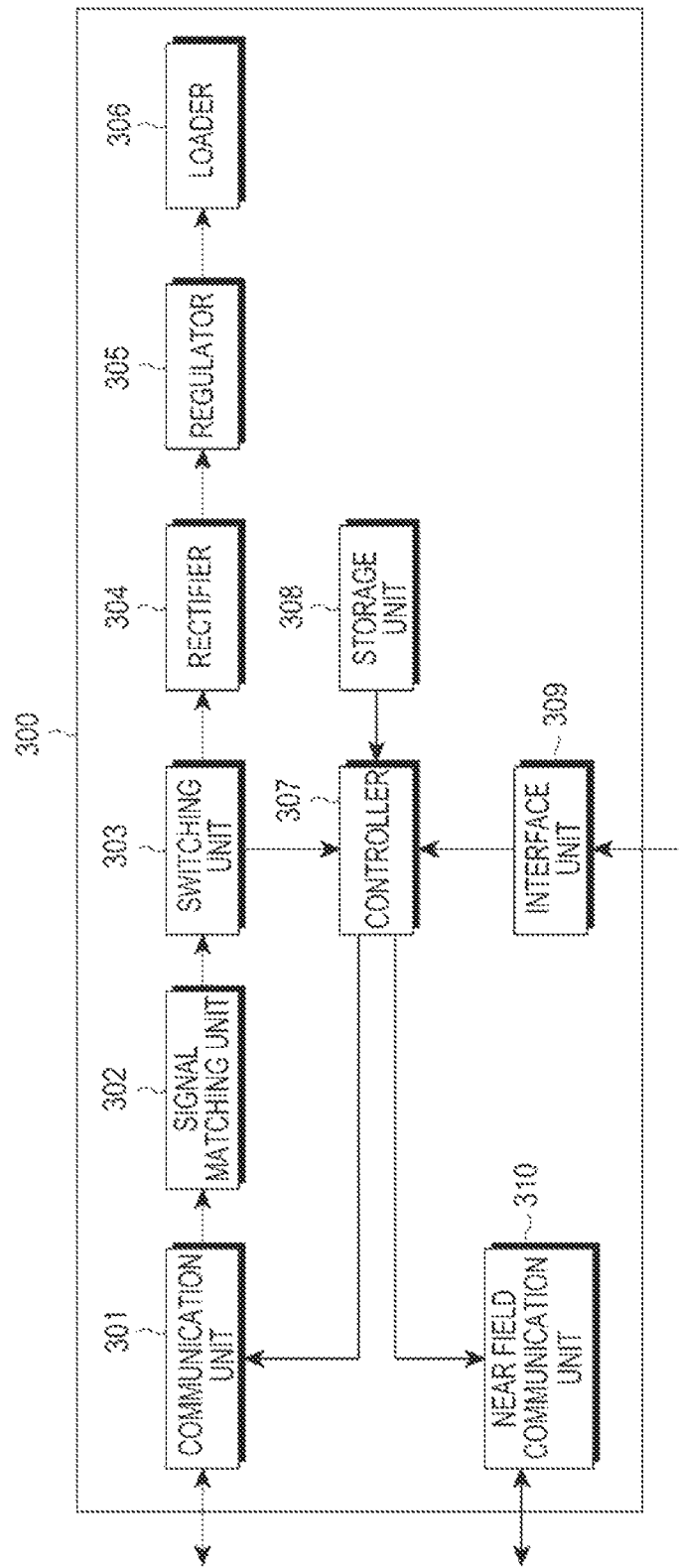
FIG. 3 is a block diagram illustrating a wireless power receiver according to the present invention.

FIG. 3 is a block diagram illustrating a wireless power receiver 300 according to the present invention.

As shown in FIG. 3, the wireless power receiver 300 includes a communication unit 301, a signal matching unit 302, a switching unit 303, a rectifier 304, a regulator 305, a loader 306, a controller 307, a storage unit 308, an interface unit 309, and an NFC unit 310.

The communication unit 301 receives at least one of the wireless power and the communication signal from the wireless power supplier. The communication unit 301 also receives a ping signal from the wireless power supplier. When the communication unit 301 receives the ping signal, a driving may be initiated using energy of the ping signal, with the ping signal being periodically wirelessly transmitted, and the communication unit 301 receiving the ping signal when the wireless power receiver 300 is placed near the wireless power transmitter. The communication unit 301 transmits the corresponding communication signal input from the controller 307 to the wireless power supplier 110 (FIG. 1).

The signal matching unit 302 performs an impedance matching between the wireless power receiver 300 and an electrically connected component, for example, the wireless power supplier 110 or another wireless power receiver.

As described in FIGS. 2B and 2C, when the controller 307 determines that the communication unit 301 simultaneously receives an input of both the wireless power and the communication signal, the switching unit 303 transfers the total input power including the wireless power and the communication signal to the rectifier 304 and the controller 307 based on the predetermined ratio. Further, when the controller 307 determines that the communication unit 301 receives only the communication signal, the switching unit 303 transfers the communication signal to the controller 307, as described above in regards to FIG. 2C.

The rectifier 304 performs a rectification operation for a received signal of a received AC waveform to convert the received signal of the AC waveform to a DC waveform.

The regulator 305 transfers the rectified received signal, that is, supplied power to the loader 306 with a predetermined efficiency. The regulator 305 properly controls a transfer ratio of the power so that excessive voltage or power is not applied to the loader 306 in a short period of time. Further, the regulator 305 can decrease or increase a voltage or a current of the received signal to a required voltage or current.

The loader 306 may use or store power, and may be implemented as a battery and the like when the wireless power receiver 306 is a mobile phone or a smart phone.

The controller 307 controls the general operation of the wireless power receiver 300 based on a user input signal input from the interface unit 309. The controller 307 controls an operation of the switching unit 303 based on an algorithm, a program, or an application stored in the storage unit 308.

The controller 307 also generates a corresponding communication signal based on the input communication signal and outputs the corresponding communication signal to the communication unit 301 or the NFC unit 310.

The storage unit 308 can store an algorithm, a program, or an application for controlling the general operation of the wireless power receiver 300 used by the controller 307. The storage unit 308 may be a Non-Volatile Memory (NVM), such as a Solid State Disk (SSD), a Flash Memory Card, a Read Only Memory (ROM) and the like, or a volatile memory, such as a Random Access Memory (RAM) and the like.

The interface unit 309 has a key matrix structure (not shown), and includes a character key, a number key, various functions keys, and a speaker to output a key input signal corresponding to a key input by the user to the controller 307. The interface unit 309 may also be implemented in a touch screen type.

The NFC unit 310 can output the corresponding communication signal received from the controller 307 to the wireless power supplier using NFC, Zigbee™ communication, infrared communication, a visible ray communication and the like.

Figure 4A:
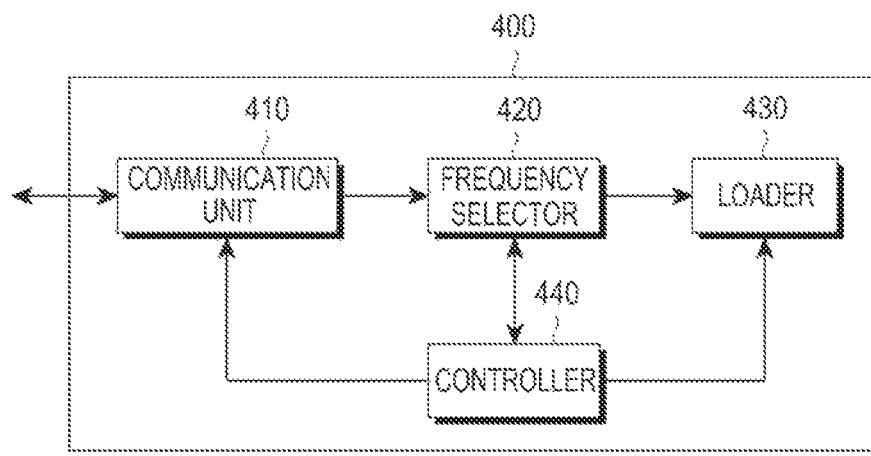
FIG. 4A is a block diagram of a wireless power receiver when wireless power and a communication signal use different frequencies.

FIG. 4A is a block diagram of a wireless power receiver when the wireless power and the communication signal use different frequencies.

As shown in FIG. 4A, a wireless power receiver 400 includes a communication unit 410, a frequency selector 420, a loader 430, and a controller 440.

The communication unit 410 receives wireless power from the wireless power supplier. The wireless power receiver 400 according to the present invention receives the wireless power from the wireless power supplier based on a resonant technique, via a loop coil having a predetermined inductance.

The communication unit 410 also receives the communication signal. However, in the present embodiment, the wireless power and the communication signal have different frequencies, and the communication unit 410 can receive signals that are transmitted in a plurality of frequencies.

The frequency selector 420 distinguishes the input wireless power and communication signal of different frequencies and outputs the wireless power and the communication signal to the loader 430 and the controller 440, respectively. The frequency selector 420 determines an appropriate path for output of the wireless power and the communication signal, for example, by filtering, as described below.

The loader 430 stores the wireless power received by the wireless power receiver 400 or externally outputs the power.

The controller 440 controls a general operation of the wireless power receiver 400, generates a corresponding communication signal in accordance with the input communication signal, and outputs the corresponding communication signal.

Figure 4B:
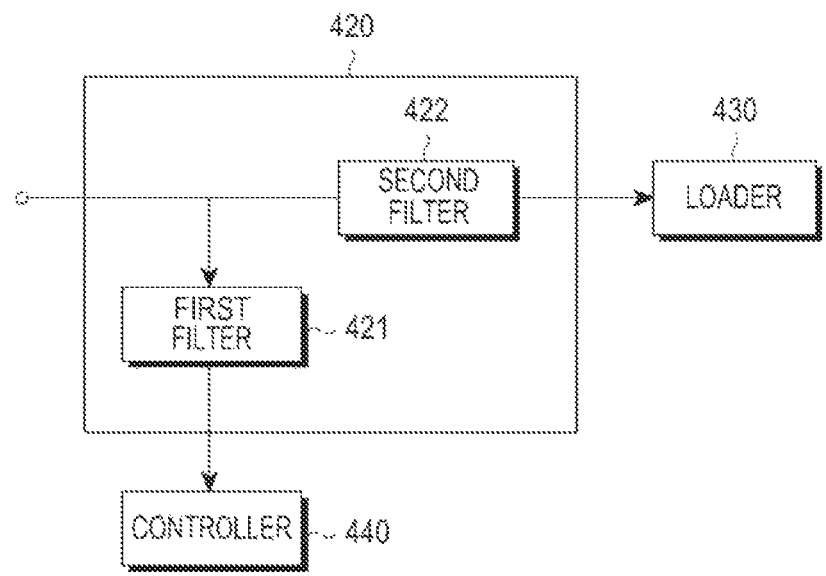
FIG. 4B is a block diagram of a frequency selector according to the present invention.

FIG. 4B is a block diagram of the frequency selector of the present invention.

As shown in FIG. 4B, the frequency selector 420 includes first and second filters 421 and 422. The first filter 421 may be, for example, a high pass filter, and the second filter 422 may be, for example, a low pass filter. When the wireless power and the communication signal are simultaneously input to the frequency selector 420, the communication signal typically has a frequency higher than a frequency of the wireless power signal.

The first filter 421 blocks the wireless power and passes the communication signal. The second filter 422 blocks the communication signal and passes the wireless power. Accordingly, the wireless power and the communication signal are output to the loader 430 and the controller 440, respectively. Although the above description provides first and second filters 421 and 422 implemented as high-pass and low-pass filters, respectively, those skilled in the art will recognize based on the disclosure herein additional various embodiments where the first and second filters are implemented by a band-pass filter for passing particular respective frequencies and that the wireless power receiver 400 may further include a signal matching unit, a rectifier, a regulator, a storage unit, an interface unit, and an NFC unit.

Figure 5:
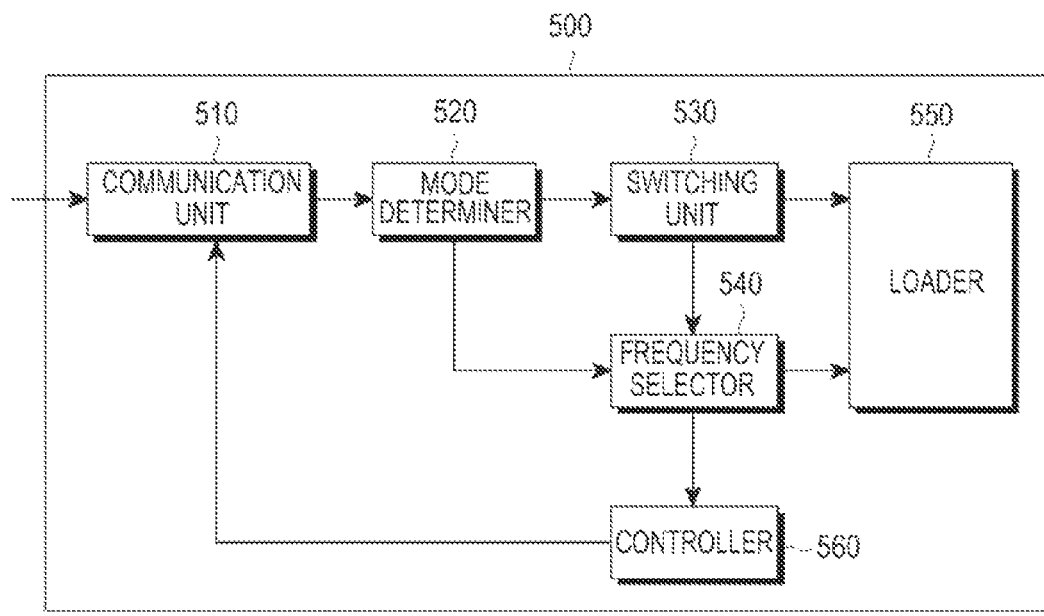
FIG. 5 is a block diagram of a wireless power receiver according to the present invention.

FIG. 5 is a block diagram of a wireless power receiver 500 of the present invention.

As shown in FIG. 5, the wireless power receiver 500 includes a communication unit 510, a mode determiner 520, a switching unit 530, a frequency selector 540, a loader 550, and a controller 560.

The communication unit 510 receives wireless power provided from the power supplier, receives the wireless power from the wireless power supplier based on a resonant technique, and receives communication signals in a plurality of frequencies.

The mode determiner 520 determines a first mode or a second mode based on whether the wireless power and the communication signal input to the communication unit 510 are the same, i.e. have an equal, frequency or different frequencies. Here, it is assumed that the first mode means that the wireless power and the communication signal have an equal frequency, and the second mode means that the wireless power and the communication signal have different frequencies. The mode determiner 520 determines whether the wireless power and the communication signal have an equal frequency or different frequencies, to determine the mode, and the mode determiner 520 is a different element from the controller 560, the mode determiner 520 and the controller 560 may be implemented by one hardware, for example, a microprocessor. Alternatively, the mode determiner 520 may be implemented by a switch for switching the wireless power and the communication signal to the switching unit 530 or the frequency selector 540 and outputting the wireless power and the communication according to a control of the controller 560.

For the first mode, the mode determiner 520 outputs the input wireless power and communication signal to the switching unit 530. For the second mode, the mode determiner 520 outputs the input wireless power and communication signal to the frequency selector 540. The switching unit 530 and the frequency selector 540 are similar to the switching unit 220 of FIG. 2A and the frequency selector 420 of FIG. 4A, and accordingly detailed descriptions thereof are not repeated here.

The mode determiner 520 determines whether frequencies of the wireless power and communication signal input from the communication unit 510 are equal or different, and, as described above, the controller 560 controls the switching unit 530 and the frequency selector 540 based on the mode selection by the mode determiner 520.

Accordingly, the wireless power and the communication signal are independently stored and processed, respectively, when the frequencies of the wireless power and the communication signal are equal or different.

Figure 6:
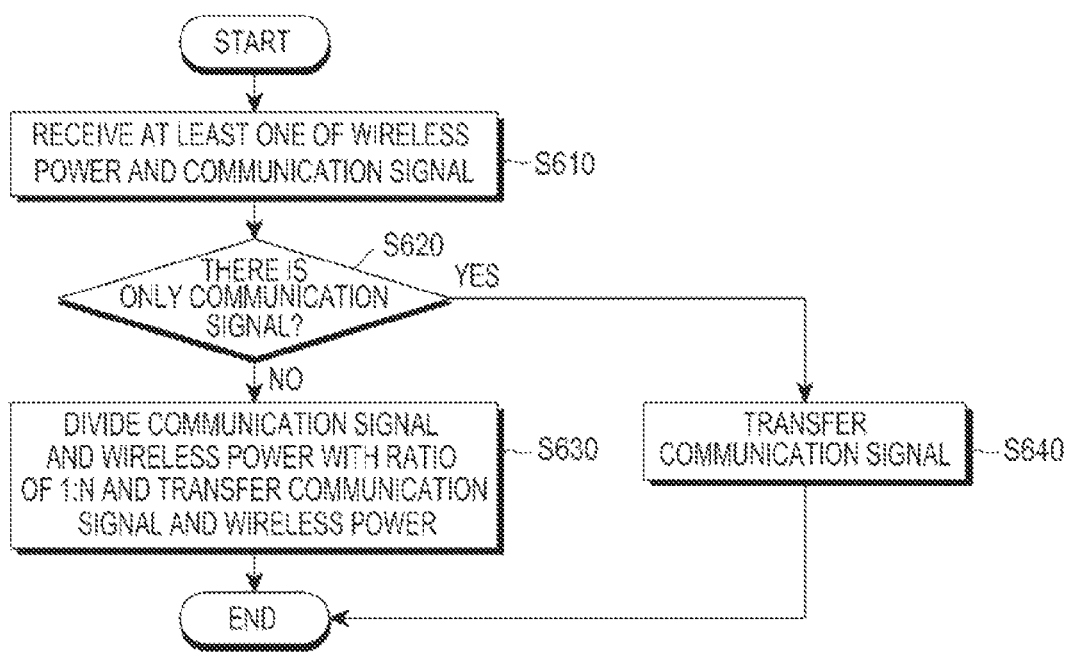
FIG. 6 is a flowchart of a method of controlling a wireless power receiver when frequencies of wireless power and a communication signal are equal according to the present invention.

FIG. 6 is a flowchart of a method of controlling the wireless power receiver when frequencies of the wireless power and the communication signal are equal of the present invention. As shown in FIG. 6, at least one of the wireless power and the communication signal are received in step S610, and a determination is made whether the received signal is only the communication signal in step S620.

If both the wireless power and the communication signal are determined to have been simultaneously received, the wireless power receiver divides the total received power by a predetermined ratio and independently processes divided portions of the total power in step S630. If only the communication signal is determined to have been received, the wireless power receiver processes the communication signal in step S640.

Figure 7:
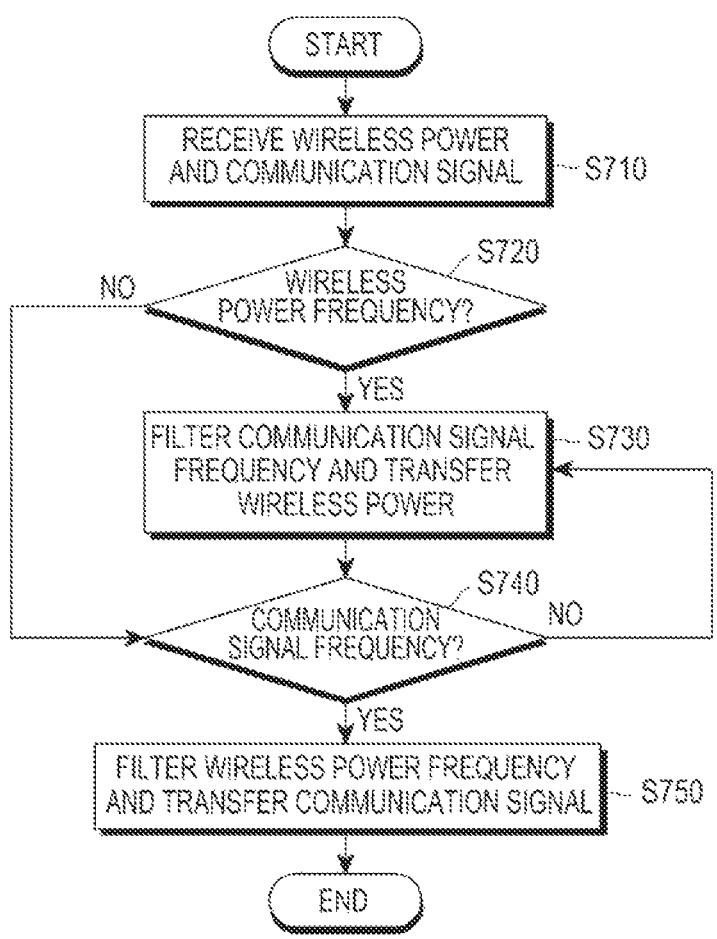
FIG. 7 is a flowchart of a method of controlling a wireless power receiver when frequencies of wireless power and a communication signal are different according to the present invention.

FIG. 7 is a flowchart of a method of controlling the wireless power receiver when frequencies of the wireless power and the communication signal are different according to the present invention. As shown in FIG. 7, the wireless power and the communication signal are received in step S710.

If the wireless power frequency is identified in step S720, wireless power is transferred by filtering the communication signal in step S730. If wireless frequency is not detected in step S720, the method proceeds to step S740, and a determination is made of whether a communication signal frequency is input.

If the communication signal frequency is not detected in step S740, the method returns to step S730. If the communication signal frequency is detected in step S740, the communication signal is transferred by filtering the frequency of the wireless signal in step S750.

Figure 8:
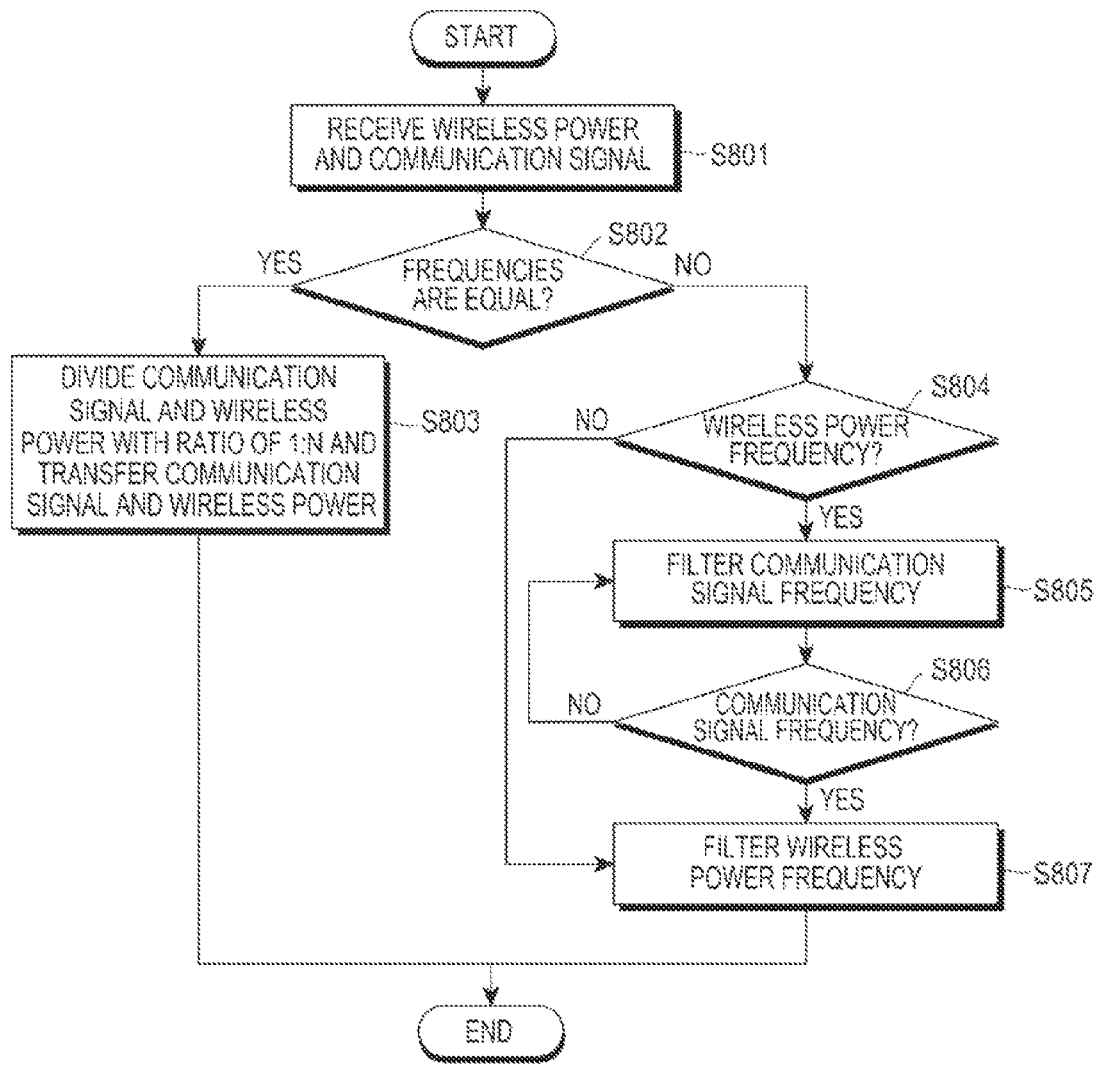
FIG. 8 is a flowchart of a method of controlling a wireless power receiver according to the present invention.

FIG. 8 is a flowchart illustrating a method of controlling the wireless power receiver according to the present invention.

The wireless power and the communication signal are received in step S801, and a determination is made of whether the wireless power and the communication signal have an equal frequency or different frequencies in step S802.

As a result of the determination, when the wireless power and the communication signal have equal frequencies, the total input power is divided by a predetermined ratio and wireless power and the communication signal are individually processed in step S803.

If the wireless power and the communication signal have the different frequencies the method proceeds to step S804. If the wireless power frequency is identified in step S804, wireless power is transferred by filtering the communication signal frequency in step S805. If in step S804 wireless power frequency is not detected, the method proceeds to step S807, below.

After step S805, a determination is made if the communication signal frequency is present in step S806. If the communication signal frequency is not present, the method returns to step S805. If the communication signal frequency is present, the communication signal is transferred by filtering the frequency of the wireless signal in step S807.

While the present invention has been shown and described with reference to certain embodiments thereof, it will be understood by those skilled in the art that various changes in form and details may be made therein without departing from the spirit and scope of the present invention as defined by the appended claims. Accordingly, the present invention can be variously changed and then implemented without departing from the scope of the present invention claimed by the claims, and the variation embodiments should not be understood independently from the technical idea or view of the present invention.

What is claimed is:

1. A wireless power receiver comprising:
   a communication unit for receiving wireless power and a communication signal from a wireless power supplier, wherein the received wireless power and received communication signal power are a total input power;
   a controller for determining whether the wireless power is received from the wireless power supplier;
   a loader for storing the received wireless power; and
   a switching unit for, when the wireless power is determined to have been received, dividing the total input power by a predetermined ratio and transferring the divided power to the controller and the loader, based on the predetermined ratio.

2. The wireless power receiver of claim 1, wherein the switching unit comprises:
   a first switch for switching between the communication unit and the controller; and
   a second switch for switching the controller,
   wherein the first switch and the second switch are connected in parallel.

3. The wireless power receiver of claim 2, wherein, when the communication unit simultaneously receives the wireless power and the communication signal, the controller opens the first switch and closes the second switch.

4. The wireless power receiver of claim 3, wherein the second switch outputs the total input power to the controller and the communication unit according to the predetermined ratio.

5. The wireless power receiver of claim 2, wherein, when the communication unit receives only the communication signal, the first switch is closed and the second switch is open.

6. The wireless power receiver of claim 1, further comprising:
   a rectifier for rectifying the wireless power; and
   a regulator for transferring the rectified wireless power to the loader.

7. A method of controlling a wireless power receiver, the method comprising:
   receiving wireless power and a communication signal from a wireless power supplier;
   determining whether the wireless power is received from the wireless power supplier;
   when the wireless power is determined to have been received, dividing the wireless power and the communication signal by a predetermined ratio; and
   transferring the divided total power through different paths to store the wireless power and to process the communication signal.

8. The method of claim 7, further comprising:
   rectifying the wireless power to a DC waveform; and
   filtering the rectified wireless power.

9. A wireless power receiver comprising:
   a communication unit for receiving wireless power and a communication signal having different frequencies from a wireless power supplier;
   a controller for generating a signal corresponding to the received communication signal;
   a loader for storing the received wireless power; and
   a frequency selector for distinguishing the frequencies of the received wireless power and the received communication signal, and for outputting the received wireless power and the received communication signal to the loader and the controller, respectively.

10. The wireless power receiver of claim 9, wherein the frequency selector comprises:
    a first filter for filtering the received wireless power; and
    a second filter for filtering the received communication signal.

11. The wireless power receiver of claim 10, wherein the first filter filters the received wireless power and outputs the received communication signal to the controller and the second filter filters the received communication signal and outputs the received wireless power to the loader.

12. The wireless power receiver of claim 9, further comprising:
    a rectifier for rectifying the wireless power; and
    a regulator for transferring the rectified wireless power to the loader.

13. A method of controlling a wireless power receiver, the method comprising:
    receiving wireless power and a communication signal having different frequencies from a wireless power supplier;
    distinguishing the frequencies of the received wireless power and the received communication signal, and independently outputting the received wireless power and the received communication signal;
    storing the received wireless power; and
    generating a signal corresponding to the received communication signal.

14. The method of claim 13, wherein independently outputting the received wireless power and the received communication signal comprises:
    performing a first filtering of the wireless power and outputting the communication signal through a first path; and
    performing a second filtering of the communication signal and outputting the wireless power through a second path.

15. The method of claim 13, further comprising:
    rectifying the wireless power; and
    transferring the rectified wireless power.

16. A method of controlling a wireless power receiver, the method comprising:
    receiving wireless power and a communication signal from a wireless power supplier;
    determining whether frequencies of the received wireless power and the received communication signal are equal;
    when the frequencies of the received wireless power and the received communication signal are equal, dividing a total input power of the received wireless power and the received communication signal by a predetermined ratio and independently processing the received wireless power and the received communication signal based on the predetermined ratio; and
    when the frequencies of the received wireless power and the received communication signal are different, distinguishing the frequencies of the received wireless power and the received communication signal and independently processing the received wireless power and the received communication signal.

* * * * *